(12) United States Patent
Makino et al.

(10) Patent No.: US 10,850,673 B2
(45) Date of Patent: Dec. 1, 2020

(54) STORAGE STRUCTURE FOR VEHICLE INTERIOR

(71) Applicants: TS TECH CO., LTD., Asaka (JP); HONDA MOTOR CO., LTD., Tokyo (JP)

(72) Inventors: Yoshiyuki Makino, Tochigi-ken (JP); Tomomi Sakamoto, Tochigi-ken (JP); Naoki Takahashi, Wako (JP)

(73) Assignees: TS Tech Co., Ltd., Saitama (JP); Honda Motor Co., Ltd., Tokyo (JP)

( * ) Notice: Subject to any disclaimer, the term of this patent is extended or adjusted under 35 U.S.C. 154(b) by 84 days.

(21) Appl. No.: 16/140,728

(22) Filed: Sep. 25, 2018

(65) Prior Publication Data

US 2019/0092245 A1 Mar. 28, 2019

(30) Foreign Application Priority Data

Sep. 26, 2017 (JP) ................. 2017-184250

(51) Int. Cl.
*B60R 7/04* (2006.01)
*B60R 7/02* (2006.01)
(Continued)

(52) U.S. Cl.
CPC ............. *B60R 7/046* (2013.01); *B60N 3/10* (2013.01); *B60R 7/02* (2013.01); *B60R 7/08* (2013.01);
(Continued)

(58) Field of Classification Search
CPC ............. B60R 7/046; B60R 13/0243; B60R 2013/0287; B60R 11/00; B60R 7/04; B60R 13/02; B60R 2013/0281; B60R 13/0275; B60N 2/78; B60N 3/101; B60N 3/102; B60N 3/026; B60N 3/10; B60N 2/79; B60N 2/797; B60N 3/00; B60N 3/08
USPC ...... 296/37.13, 146.7, 37.8, 37.16, 84.1, 63, 296/51, 50; 224/544, 543, 539, 547, 926, 224/915, 585; 264/255, 279, 250, 257, 264/273, 278
See application file for complete search history.

(56) References Cited

U.S. PATENT DOCUMENTS 5,535,571 A * 7/1996 Nichols ................... B29C 33/48
296/152
6,073,984 A * 6/2000 Chaloult ................... B60R 7/02
296/37.13
(Continued)

FOREIGN PATENT DOCUMENTS

JP 2009-119964 A 6/2009

*Primary Examiner* — D Glenn Dayoan
*Assistant Examiner* — Sunsurraye Westbrook
(74) *Attorney, Agent, or Firm* — Carrier Blackman & Associates, P.C.; William D. Blackman; Joseph P. Carrier

(57) ABSTRACT

A storage structure for a vehicle interior includes a hollowed storage unit having an opening in the top of the storage unit. The storage unit includes a storage sidewall section surrounding a storage space for an object to be stored. The storage sidewall section includes a sidewall body portion and a sidewall member formed of a member separate from the sidewall body portion. The sidewall member is configured such that an engaging hook provided for the sidewall member is urged against an engaging recess provided for the sidewall body portion when a load is applied on the sidewall member from an outside to an inside of the storage unit.

18 Claims, 5 Drawing Sheets

(51) Int. Cl.
   *B60R 7/08*   (2006.01)
   *B60N 3/10*   (2006.01)
   *B60R 11/00*  (2006.01)

(52) U.S. Cl.
   CPC ............... *B60R 2011/0021* (2013.01); *B60R 2011/0075* (2013.01)

(56) References Cited

U.S. PATENT DOCUMENTS

| | | | | |
|---|---|---|---|---|
| 6,692,053 | B1* | 2/2004 | Smith | B60N 3/102 |
| | | | | 224/282 |
| 6,926,332 | B2* | 8/2005 | Youngs | B60R 7/046 |
| | | | | 224/277 |
| 7,063,367 | B2* | 6/2006 | Wakou | B60R 7/046 |
| | | | | 224/544 |
| 8,544,928 | B2* | 10/2013 | Orlowsky | B60R 7/046 |
| | | | | 224/543 |
| 2005/0205739 | A1* | 9/2005 | DePue | B60N 3/106 |
| | | | | 248/311.2 |
| 2014/0138978 | A1* | 5/2014 | Langenbacher | B60N 3/101 |
| | | | | 296/37.13 |
| 2015/0298616 | A1* | 10/2015 | Dassen | B60R 7/046 |
| | | | | 296/37.13 |
| 2015/0329057 | A1* | 11/2015 | Tiboni | B60R 13/0243 |
| | | | | 296/37.13 |

\* cited by examiner

STORAGE STRUCTURE FOR VEHICLE INTERIOR

CROSS-REFERENCE TO RELATED APPLICATION

This application is based upon and claims the benefit of priority from Japanese Patent Application No. 2017-184250 filed on Sep. 26, 2017, the contents of which are incorporated herein by reference.

BACKGROUND OF THE INVENTION

Field of the Invention

The present invention relates to storage structures for vehicle interiors.

Description of the Related Art

Storage structures provided for, for example, side doors of vehicles inside vehicle cabins are well known (for example, see Japanese Laid-Open Patent Publication No. 2009-119964). Such a storage structure for a vehicle interior includes a pocket-shaped storage unit having an opening in the top of the storage unit. Objects to be stored in the storage unit include, for example, containers such as beverage containers.

SUMMARY OF THE INVENTION

In a conventional storage structure for a vehicle interior, a wall portion constituting a storage unit is composed of a hard material such as rigid resin and thus is not usually deformed easily. To prevent an object to be stored or the wall portion of the storage unit from being damaged when the object is put in or taken out of the storage unit, for example, the wall portion constituting the storage unit may be partially formed of a separate member (hereinafter referred to as "sidewall member"), and the sidewall member may be movable when a force larger than or equal to a predetermined level acts on the sidewall member. However, when a load is applied to the sidewall member from the outside to the inside of the storage unit, the sidewall member may be detached inward.

The present invention has been devised taking into consideration the aforementioned problems, and has the object of providing a storage structure for a vehicle interior capable of preventing a sidewall member from being detached inward when a force acts on the sidewall member from the outside to the inside of a storage unit.

A principal object of the present invention is to provide a storage structure for a vehicle interior, provided for an interior of a vehicle to store an object to be stored, including a hollowed storage unit with an opening in a top of the storage unit, including:

a storage sidewall section of the storage unit surrounding a storage space for the object;

a sidewall body portion and a sidewall member constituting the storage sidewall section, the sidewall member being formed of a member separate from the sidewall body portion;

an engaging hook disposed on the sidewall member and protruding toward the sidewall body portion; and an engaging recess provided for the sidewall body portion at a part facing the sidewall member and with which the engaging hook engages;

wherein the sidewall member is configured in a manner that the engaging hook is urged against the engaging recess when a load is applied on the sidewall member from an outside to an inside of the storage unit.

According to the storage structure for the vehicle interior of the present invention configured as above, when a load is applied on the sidewall member from the outside to the inside of the storage unit, the engaging hook of the sidewall member is urged against the engaging recess of the sidewall body portion. This prevents the sidewall member from being detached toward the inside of the storage unit.

The sidewall member may include a wall plate portion constituting a part of an outer surface of the storage sidewall section, protruding walls protruding from both sides of the wall plate portion in a width direction of the wall plate portion toward the storage space, and the engaging hook protruding outward from a protruding end of one of the protruding walls.

With this configuration, when a load is applied from the outside to the inside of the storage unit, a force directed outward from the sidewall member in the width direction acts on the engaging hook. Thus, the engagement between the engaging hook and the engaging recess is maintained. This prevents the sidewall member from being detached toward the inside of the storage unit more preferably. On the other hand, when a load is applied on the sidewall member from the inside to the outside of the storage unit, the wall plate portion bends outward, and the engaging hook is detached from the engaging recess. Thus, the sidewall member is detached outward from the storage unit relatively easily.

The sidewall member may include reinforcing portions each connecting an inner surface of the wall plate portion with an inner surface of the corresponding protruding wall.

This configuration improves the rigidity of the vicinity of the engaging hook.

A bottom of the storage unit and a lower part of the sidewall member may partially overlap with each other in a vertical direction.

This configuration provides excellent rigidity for the bottom of the storage unit.

A bottom of the storage unit may include a stepped wall portion forming a difference in level. The sidewall member may include a connecting protrusion connecting with the bottom of the storage unit. The stepped wall portion may include a connecting hole with which the connecting protrusion engages.

This configuration prevents the engaging hole from being viewed while the connecting protrusion engages with the connecting hole.

The sidewall member may include a connecting protrusion engaging with a bottom of the storage unit. The bottom of the storage unit may include a connecting hole with which the connecting protrusion engages. The connecting protrusion may protrude below the bottom of the storage unit through the connecting hole.

This configuration improves the assembling workability and prevents the sidewall member from being detached.

A bottom of the storage unit may include a first bottom portion formed of a member separate from the sidewall member and a second bottom portion constituting a lower part of the sidewall member. The second bottom portion may be provided with a reinforcing wall.

This configuration improves the rigidity of the bottom of the storage unit.

A dowel brought into contact with the sidewall body portion may be disposed on a surface of the sidewall member facing the sidewall body portion.

This configuration enables a gap between the sidewall member and the sidewall body portion to be kept constant, resulting in an improvement in appearance.

The sidewall member may be composed of a soft resin material.

This configuration enables the sidewall member to bend easily. Thus, the sidewall member readily detachable outward can be easily achieved. Moreover, the sidewall member moved outward can be easily returned to the original state.

The storage unit may be provided for a vehicle door.

This appropriately prevents the sidewall member from being detached toward the inside of the storage unit provided for the vehicle door.

The storage structure for the vehicle interior according to the present invention prevents the sidewall member from being detached inward even when a force acts on the sidewall member from the outside to the inside of the storage unit.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

A preferred embodiment of a storage structure for a vehicle interior according to the present invention will be described in detail below with reference to the accompanying drawings.

Figure 1:
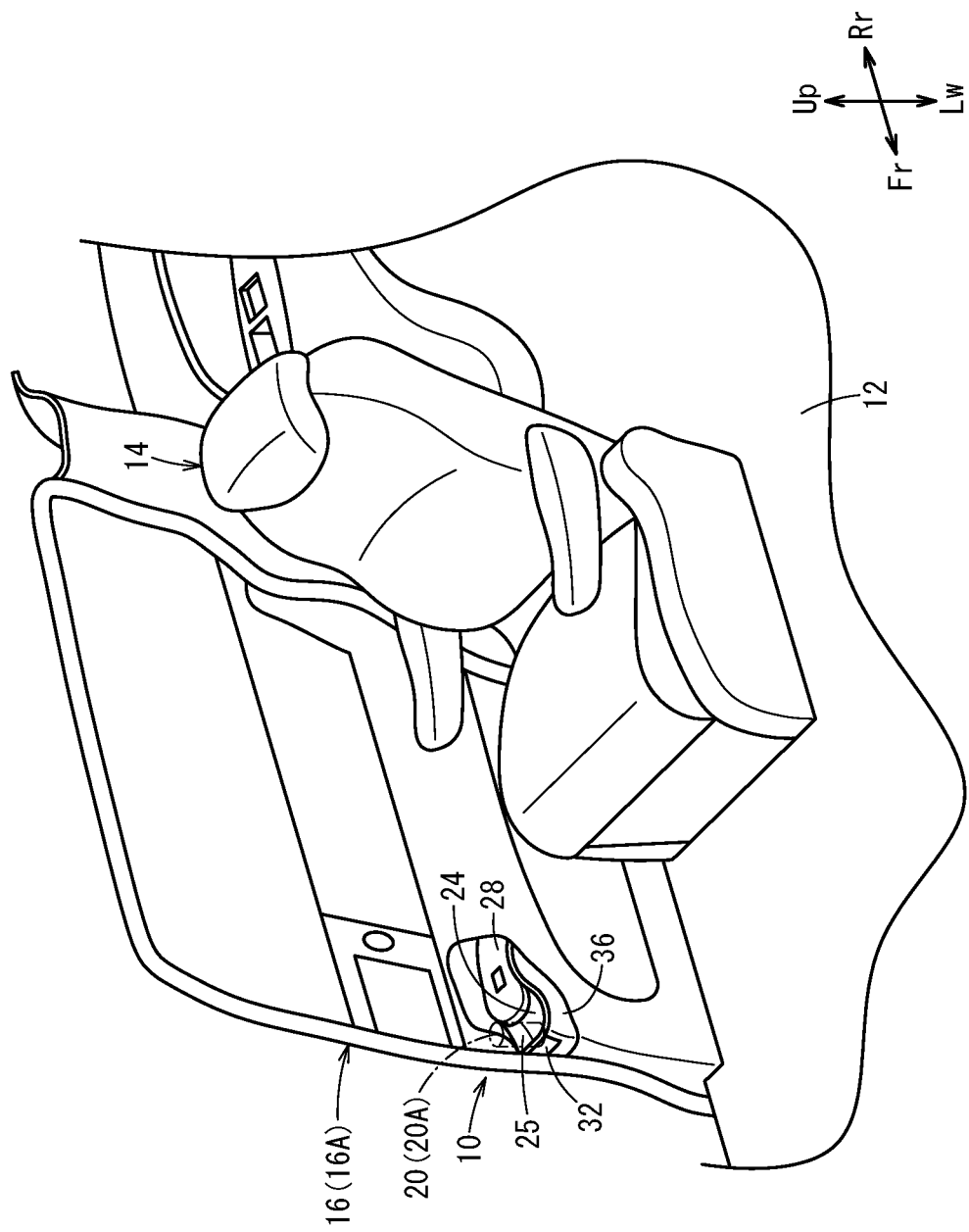
FIG. 1 is a perspective view of an interior of a vehicle including a storage structure for a vehicle interior according to an embodiment of the present invention.

The interior of a vehicle illustrated in FIG. 1 is a vehicle interior of a three-row seating type. In FIG. 1, arrows Fr, Rr, Up and Lw respectively indicate the direction toward the front of the vehicle, the direction toward the rear of the vehicle, upward, and downward. A middle-row seat 14 is disposed on the upper surface of a floor panel 12 constituting the bottom of a vehicle cabin. Although not illustrated, on the upper surface of the floor panel 12, front-row seats including a driver's seat and a passenger seat are disposed in front of the middle-row seat 14, and back-row seats are disposed behind the middle-row seat 14. A rear side door 16 serving as a vehicle door is disposed by the side of the middle-row seat 14. The rear side door 16 is configured as a sliding door 16A sliding in the longitudinal direction of the vehicle.

A storage structure 10 for a vehicle interior according to this embodiment (hereinafter, simply referred to as the "storage structure 10") including a hollowed storage unit 24 having an opening in the top thereof to store an object 20 to be stored is provided for the rear side door 16 on the side adjacent to the vehicle cabin. The object 20 includes, for example, a beverage container (bottle container 20A and the like). The object 20 may be an object other than a container. The storage structure 10 may be provided for a front side door or parts other than doors. The storage structure 10 may be provided in a vehicle interior of a two-row seating type other than the vehicle interior of the three-row seating type.

Figure 2:
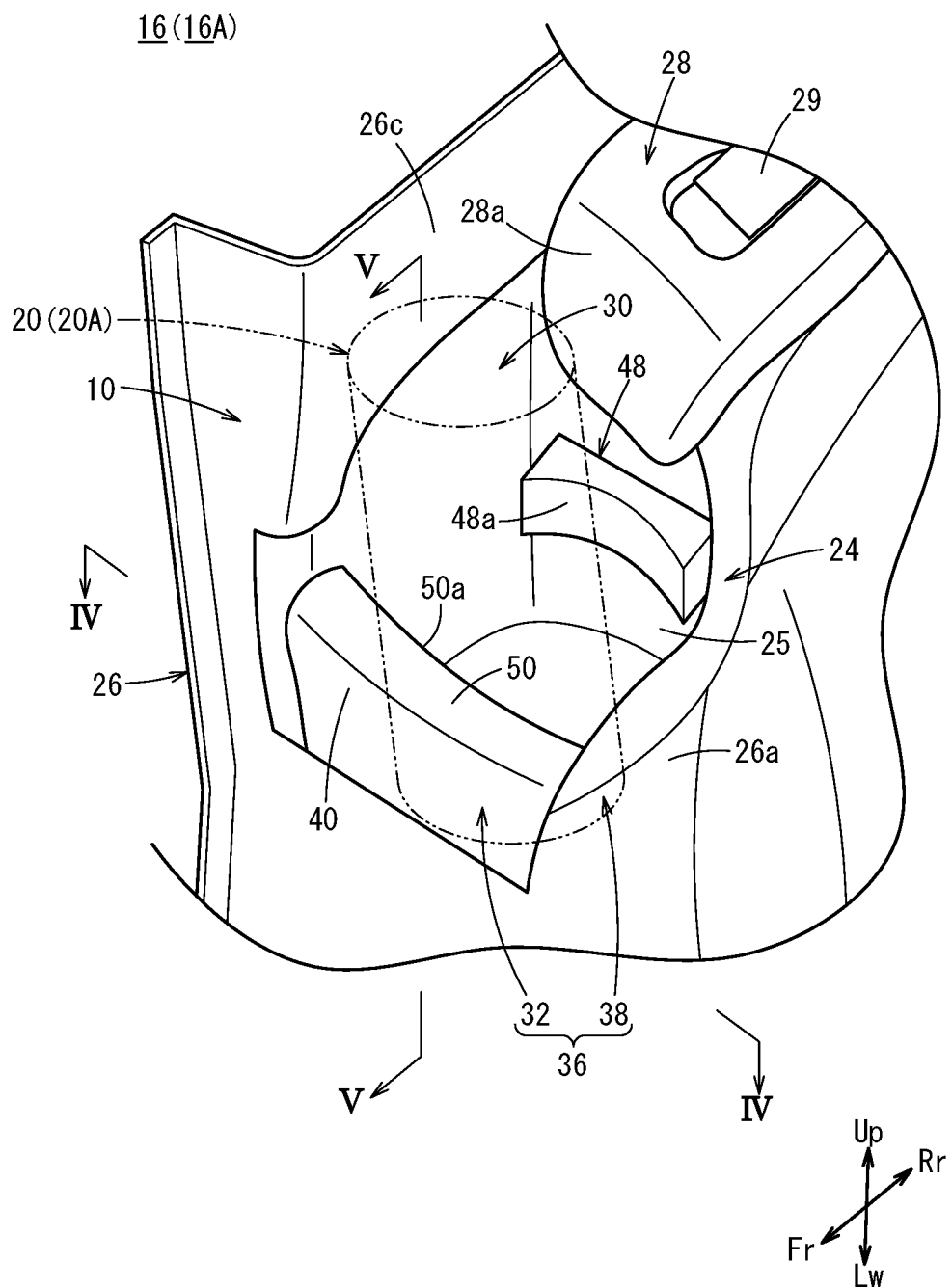
FIG. 2 is a perspective view of the storage structure for the vehicle interior.
Figure 3:
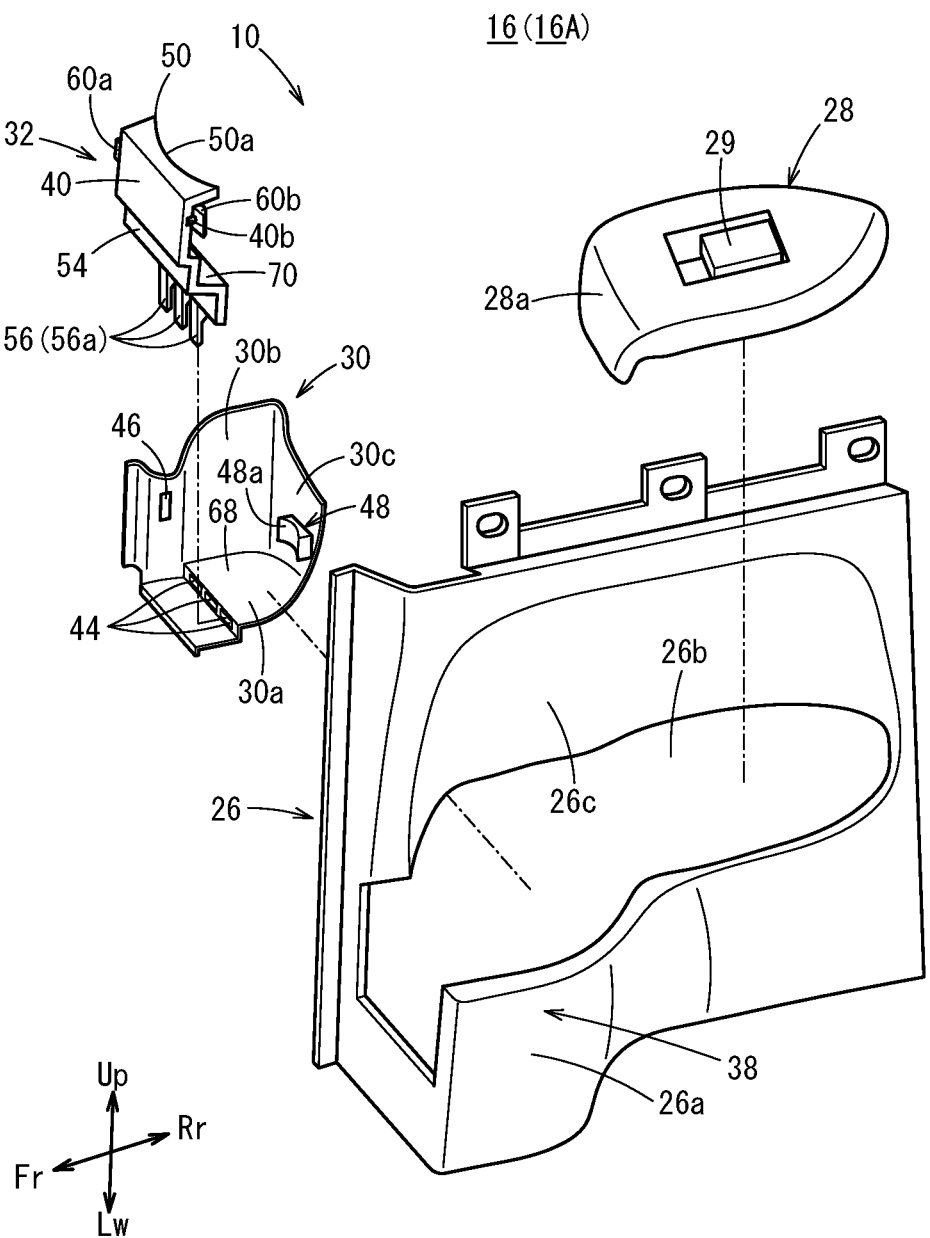
FIG. 3 is an exploded perspective view of the storage structure for the vehicle interior.

As illustrated in FIGS. 2 and 3, the sliding door 16A includes a door body member 26, a switch panel 28 attached to the door body member 26, a holder member 30 attached to the door body member 26 in front of the switch panel 28, and a sidewall member 32 disposed in front of the switch panel 28. The door body member 26, the switch panel 28, the holder member 30, and the sidewall member 32 form a storage space 25 for storing the object 20. The door body member 26, the switch panel 28, and the holder member 30 are composed of, for example, a rigid resin material.

As illustrated in FIG. 3, the door body member 26 includes an expanded portion 26a expanding toward the vehicle cabin and an opening 26b for attachment. The expanded portion 26a constitutes a front part of the opening 26b. As illustrated in FIG. 2, the switch panel 28, also functioning as an armrest, is disposed at a back part of the opening 26b. An operable switch 29 for opening and closing a window is disposed in the switch panel 28.

The storage unit 24 includes a storage sidewall section 36 surrounding the storage space 25 for the object 20. The storage sidewall section 36 includes a sidewall body portion 38 and the sidewall member 32 including a movable sidewall 40 that can move with respect to the sidewall body portion 38, and has a cylindrical shape extending vertically. It will be understood from a review of the drawings and description that the sidewall member 32 is a separate member from the sidewall body portion 38, is formed from a different material than the sidewall body portion 38, and is removable from the sidewall body portion under some circumstances, such as during vehicle service. The movable sidewall 40 of the sidewall member 32 is configured to move outward from the storage unit 24 when a force larger than or equal to a predetermined level acts on the movable sidewall 40. In this embodiment, the sidewall member 32 is composed of a soft resin material (such as rubber or elastomer), and the movable sidewall 40 can incline outward (forward) from the storage unit 24. The soft resin material used for the sidewall member 32 includes, for example, silicone rubber, butyl rubber, urethane rubber, and natural rubber.

The sidewall body portion 38 is a part of the storage sidewall section 36 other than the sidewall member 32 and, in this embodiment, includes the expanded portion 26a of the door body member 26, the holder member 30, and a front end portion 28a of the switch panel 28. The door body member 26 includes a vehicle interior structure body 26c disposed above and adjacent to the storage sidewall section 36.

Specifically, the expanded portion 26a of the door body member 26 constitutes a wall portion of the storage sidewall section 36 adjacent to the vehicle cabin. The holder member 30 constitutes a wall portion of the storage sidewall section 36 adjacent to the outside of the vehicle and a part of a wall portion of the storage sidewall section 36 adjacent to the rear of the vehicle. The front end portion 28a of the switch panel 28 constitutes the other part of the wall portion of the storage sidewall section 36 adjacent to the rear of the vehicle. The sidewall member 32 constitutes a wall portion of the storage sidewall section 36 adjacent to the front of the vehicle.

As illustrated in FIG. 3, the holder member 30 includes a bottom wall portion 30a, a sidewall portion 30b, and a back wall portion 30c. The holder member 30 is fixed to the front end of the opening 26b of the door body member 26. The bottom wall portion 30a constitutes the bottom portion of the hollowed storage unit 24. The bottom wall portion 30a has a plurality of connecting holes 44 spaced in the width direction of the vehicle. The bottom wall portion 30a may have only one connecting hole 44. The sidewall portion 30b extends upward from an end of the bottom wall portion 30a in the width direction of the vehicle (adjacent to the outside of the vehicle) and faces the inner surface of the expanded portion 26a of the door body member 26. An engaging recess 46 is formed in a front end part of the sidewall portion 30b The back wall portion 30c extends upward from the back end of the bottom wall portion 30a, extends from the back end of the sidewall portion 30b toward the vehicle cabin, and faces the sidewall member 32. The upper part of the back wall portion 30c is cut off. This causes the sidewall portion 30b to protrude above the back wall portion 30c.

As illustrated in FIG. 2, a stopper 48 is attached to the front surface of the back wall portion 30c to stop the horizontal (longitudinal and lateral) movement of the object 20 stored in the storage unit 24. An arc-shaped supporting portion 48a is formed in the front part of the stopper 48. The stopper 48 is composed of, for example, a soft resin material such as rubber.

The movable sidewall 40 is configured to engage with the sidewall body portion 38 and to disengage from the sidewall body portion 38 when a force larger than or equal to a predetermined level acts on the movable sidewall 40. The movable sidewall 40 is re-engageable with the sidewall body portion 38 after disengaging from the sidewall body portion 38. A supporting protrusion 50 protruding toward the storage space 25 is formed at an upper part of the movable sidewall 40 to support the object 20. An arc-shaped curved recess 50a is formed at the protruding end of the supporting protrusion 50.

As illustrated in FIG. 3, the sidewall member 32 includes a wall plate portion 54 constituting a part of the outer surface of the storage sidewall section 36 and a connecting portion 56 disposed below the wall plate portion 54. An upper part of the wall plate portion 54 constitutes the movable sidewall 40.

Engaging hooks 60a, 60b disengaging from the sidewall body portion 38 when the movable sidewall 40 is pushed by the object 20 (for example, the bottle container 20A) with a force larger than or equal to a predetermined level are disposed on both sides of the movable sidewall 40 in the width direction. The engaging hooks 60a, 60b protrude from the movable sidewall 40 in the width directions of the vehicle. The engaging hooks 60a, 60b are integrally molded with the movable sidewall 40 in an upper part of the movable sidewall 40. Two or more engaging hooks 60a, 60b may be formed with a space or spaces therebetween in the vertical direction.

Figure 4:
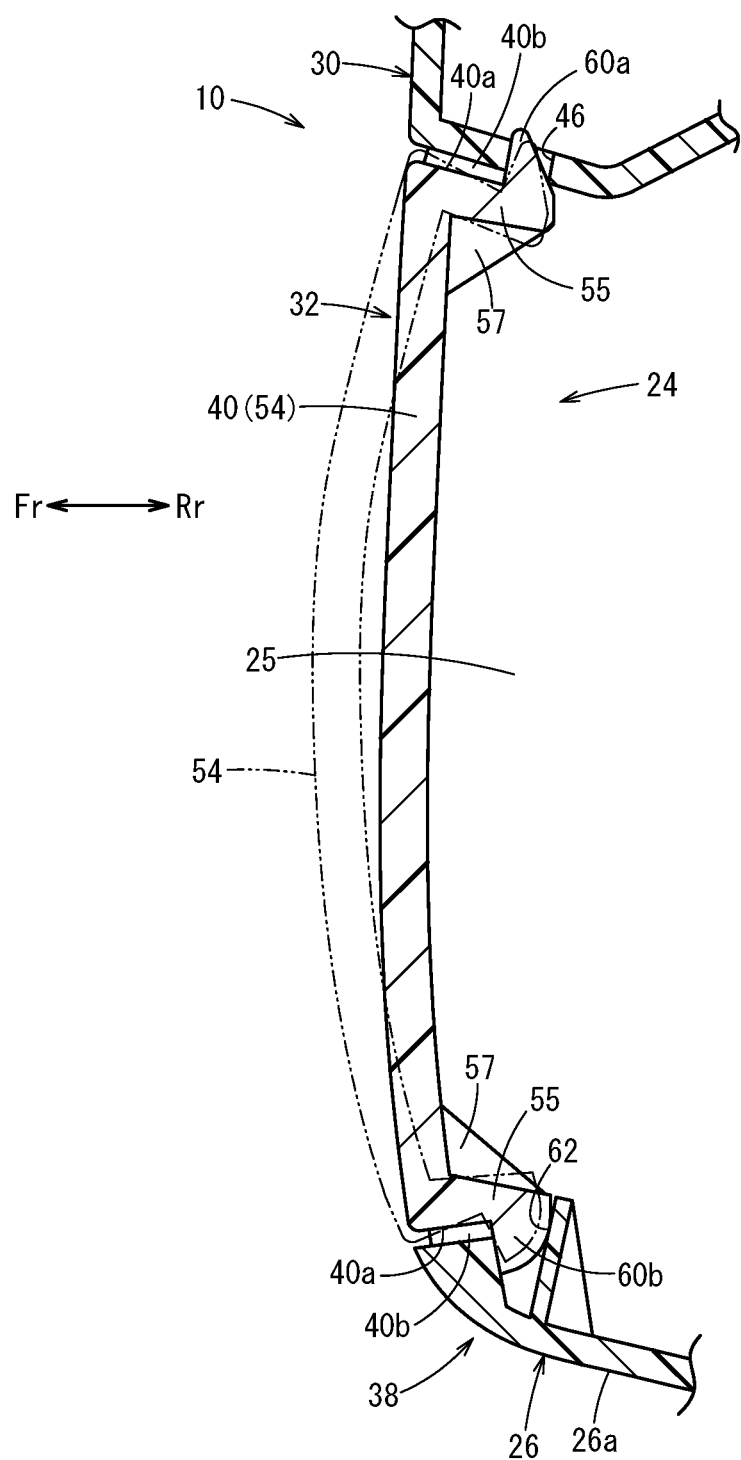
FIG. 4 is a cross-sectional view taken along line IV-IV in FIG. 2.

As illustrated in FIG. 4, the engaging hook 60a on one side (adjacent to the outside of the vehicle) engages with the engaging recess 46 formed in the holder member 30. The engaging hook 60b on the other side (adjacent to the vehicle cabin) engages with an engaging recess 62 formed in a front end part of the door body member 26. Dowels 40b (see also FIG. 3) are disposed at both end surfaces 40a of the movable sidewall 40 in the width direction and are brought into contact with the sidewall body portion 38 facing the end surfaces 40a. An engaging portion (engaging hole or engaging groove) engaging with the engaging hook 60a may also be formed between the holder member 30 and the door body member 26. The movable sidewall 40 may include only one engaging hook (engaging hook 60a or 60b) on one of the two sides in the width direction.

The sidewall member 32 is configured such that the engaging hooks 60a, 60b are respectively urged against the engaging recesses 46, 62 when a load is applied on the sidewall member 32 from the outside to the inside of the storage unit 24. Specifically, the sidewall member 32 includes protruding walls 55 protruding toward the storage space 25 from both sides of the wall plate portion 54 in the width direction. The engaging hooks 60a, 60b protrude outward from the protruding ends of the respective protruding walls 55. The sidewall member 32 further includes reinforcing portions (reinforcing ribs) 57 each connecting the inner surface of the wall plate portion 54 with the inner surface of the corresponding protruding wall 55. Two or more reinforcing portions 57 may be disposed on both sides of the sidewall member 32 in the width direction with a space or spaces therebetween in the vertical direction.

As illustrated in FIG. 3, the connecting portion 56 of the sidewall member 32 includes connecting protrusions 56a protruding from the wall plate portion 54. The connecting protrusions 56a are disposed with spaces therebetween in the width direction. The connecting portion 56 may include only one connecting protrusion 56a.

Figure 5:
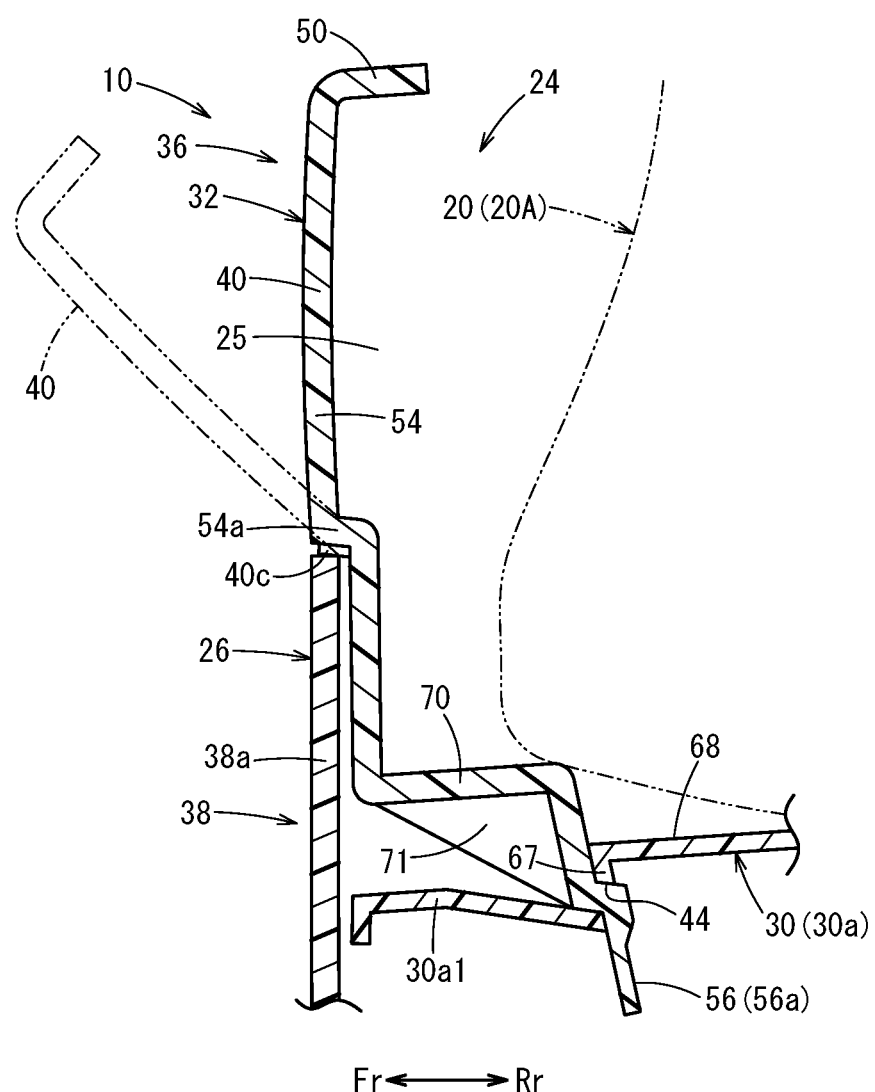
FIG. 5 is a cross-sectional view taken along line V-V in FIG. 2.

As illustrated in FIG. 5, a lower part of the wall plate portion 54 is disposed inside the door body member 26 and constitutes a part of a wall portion of the storage unit 24. The wall plate portion 54 has a shape bent to form a step (bent portion 54a). Dowels 40c are disposed on the lower surface of the bent portion 54a of the wall plate portion 54 and are brought into contact with the top end of a portion 38a of the sidewall body portion 38 substantially flush with the wall plate portion 54. The connecting protrusions 56a engage with the bottom of the storage unit 24. Specifically, the connecting protrusions 56a are fitted in and engage with the respective connecting holes 44 formed in the holder member 30. The engagement of upper parts of the connecting protrusions 56a (stepped portions between the connecting protrusions 56a and the wall plate portion 54) with the respective connecting holes 44 prevents the sidewall member 32 from separating (completely being detached) from the holder member 30.

The storage unit 24 includes a first bottom portion 68 and a second bottom portion 70 disposed at a position higher than and in front of the first bottom portion 68. The first bottom portion 68 includes the bottom wall portion 30a of the holder member 30. The second bottom portion 70 is provided for the sidewall member 32 (at a lower part of the stepped shape of the wall plate portion 54). The second bottom portion 70 is provided with a reinforcing wall 71. The reinforcing wall 71 is disposed on the lower surface of the second bottom portion 70. Two or more reinforcing walls 71 may be disposed with a space or spaces therebetween in the width direction of the sidewall member 32.

The bottom of the storage unit 24 and a lower part of the sidewall member 32 partially overlap with each other in the vertical direction. Specifically, the lower part of the sidewall member 32 (second bottom portion 70) is disposed immediately above a front end portion 30a1 of the bottom wall portion 30a of the holder member 30.

The bottom of the storage unit 24 includes a stepped wall portion 67 forming a difference in level. The connecting holes 44 are formed in the stepped wall portion 67. The connecting protrusions 56a of the sidewall member 32 protrude below the bottom of the storage unit 24 (the bottom wall portion 30a of the holder member 30) through the respective connecting holes 44.

The storage structure 10 for the vehicle interior configured as above produces the following effects.

As illustrated in FIG. 4, according to the storage structure 10 for the vehicle interior, the sidewall member 32 includes the engaging hooks 60a, 60b protruding toward the sidewall body portion 38, and the sidewall body portion 38 has the engaging recesses 46, 62 at parts facing the sidewall member 32. The engaging hooks 60a, 60b respectively engage with the engaging recesses 46, 62. When a load is applied on the sidewall member 32 from the outside to the inside of the storage unit 24, the engaging hooks 60a, 60b of the sidewall member 32 are respectively urged against the engaging recesses 46, 62 of the sidewall body portion 38. This prevents the sidewall member 32 from being detached toward the inside of the storage unit 24.

The sidewall member 32 includes the wall plate portion 54 constituting the part of the outer surface of the storage sidewall section 36, the protruding walls 55 protruding from both sides of the wall plate portion 54 in the width direction toward the storage space 25, and the engaging hooks 60a, 60b protruding outward from the protruding ends of the respective protruding walls 55. With this configuration, when a load is applied from the outside to the inside of the storage unit 24, forces directed outward from the sidewall member 32 in the width directions act on the engaging hooks 60a, 60b. Thus, the engagement between the engaging hook 60a and the engaging recess 46 and the engagement between the engaging hook 60b and the engaging recess 62 are maintained. This prevents the sidewall member 32 from being detached toward the inside of the storage unit 24 more preferably. On the other hand, when a load is applied on the sidewall member 32 from the inside to the outside of the storage unit 24, the wall plate portion 54 bends outward as indicated by virtual lines in FIG. 4, and the engaging hooks 60a, 60b are respectively detached from the engaging recesses 46, 62. Thus, the sidewall member 32 is detached outward from the storage unit 24 relatively easily.

The sidewall member 32 includes the reinforcing portions 57 each connecting the inner surface of the wall plate portion 54 with the inner surface of the corresponding protruding wall 55. This configuration improves the rigidity of the vicinities of the engaging hooks 60a, 60b. Moreover, when a load is applied from the inside to the outside of the storage unit 24, the wall plate portion 54 bends outward, and the engaging hooks 60a, 60b are accordingly pulled by the reinforcing portions 57. This facilitates separation of the engaging hooks 60a, 60b from the engaging recesses 46, 62, respectively.

As illustrated in FIG. 5, the bottom of the storage unit 24 and the lower part of the sidewall member 32 partially overlap with each other in the vertical direction. This configuration provides excellent rigidity for the bottom of the storage unit 24.

The bottom of the storage unit 24 includes the stepped wall portion 67 forming a difference in level. The sidewall member 32 includes the connecting protrusions 56a connecting with the bottom of the storage unit 24. The stepped wall portion 67 has the connecting holes 44 with which the connecting protrusions 56a engage. This configuration prevents the engaging holes from being viewed while the connecting protrusions 56a engage with the connecting holes 44.

The connecting protrusions 56a protrude below the bottom of the storage unit 24 through the connecting holes 44. This configuration improves the assembling workability and prevents the sidewall member 32 from being detached.

The bottom of the storage unit 24 includes the first bottom portion 68 formed of a member separate from the sidewall member 32 and the second bottom portion 70 constituting the lower part of the sidewall member 32. The second bottom portion 70 includes the reinforcing wall 71. This configuration improves the rigidity of the bottom of the storage unit 24.

The dowels 40b (FIG. 4) and the dowels 40c (FIG. 5) brought into contact with the sidewall body portion 38 are disposed on the surfaces of the sidewall member 32 facing the sidewall body portion 38. This configuration enables the gaps between the sidewall member 32 and the sidewall body portion 38 to be kept constant, resulting in an improvement in appearance.

According to the storage structure 10 for the vehicle interior, when a force larger than or equal to a predetermined level acts on the movable sidewall 40 constituting a part of the storage sidewall section 36, the movable sidewall 40 can move (incline or lean) outward from the storage unit 24 as indicated by the virtual lines in FIG. 5. Thus, when a force larger than or equal to a predetermined level acts on the movable sidewall 40 and the object 20 interactively while the object 20 is put in or taken out of the storage unit 24 (in particular, while the object 20 is taken out of the storage unit 24), the movable sidewall 40 moves outward from the storage unit 24. This prevents the object 20 or the storage unit 24 from being damaged.

The movable sidewall 40 engages with the sidewall body portion 38 and disengages from the sidewall body portion 38 when a force larger than or equal to a predetermined level acts on the movable sidewall 40. With this configuration, while a force larger than or equal to a predetermined level does not act on the movable sidewall 40, the storage unit 24 is appropriately maintained in the normal shape, and the function of the storage unit 24 is sufficiently carried out.

As illustrated in FIG. 2, the storage sidewall section 36 extends vertically to form a cylindrical shape, enabling the object 20 to be held easily.

As the vehicle interior structure body 26c is provided above and adjacent to the storage sidewall section 36, the object 20 can be held even when the object 20 is higher than the storage sidewall section 36.

The storage unit 24 can store the bottle container 20A serving as the object 20. The engaging hooks 60a, 60b disengaging from the sidewall body portion 38 when the movable sidewall 40 is pushed by the bottle container 20A with a force larger than or equal to a predetermined level are disposed at one side or both sides of the movable sidewall 40 in the width direction (FIG. 3). This configuration enables the bottle container 20A to be held appropriately until a force larger than or equal to a predetermined level acts on the sidewall member 32. In addition, this configuration enables the engaging hooks 60a, 60b to be detached when a force larger than or equal to a predetermined level acts on the movable sidewall 40 and allows the movable sidewall 40 to move outward to prevent the storage unit 24 from being damaged.

As illustrated in FIG. 5, the connecting portion 56 connecting with the bottom of the storage unit 24 is disposed at the lower part of the sidewall member 32. With this configuration, the connection between the connecting portion 56 and the bottom of the storage unit 24 is maintained even when the movable sidewall 40 moves outward from the storage unit 24. Thus, the sidewall member 32 does not completely separate from the storage unit 24. In particular, the connecting portion 56 includes the connecting protrusions 56a engaging with the bottom of the storage unit 24. Thus, the sidewall member 32 can be easily connected with the bottom of the storage unit 24 during assembling.

The storage unit 24 includes the first bottom portion 68 and the second bottom portion 70 disposed at a position higher than and in front of the first bottom portion 68, and the second bottom portion 70 is provided for the sidewall member 32. This configuration causes the object 20 to incline obliquely backward while the object 20 is stored in the storage unit 24. Thus, the object 20 does not easily lean forward when the vehicle decelerates.

The sidewall member 32 is composed of a soft resin material. This configuration enables the sidewall member 32 to bend easily. Thus, a mechanism allowing the movable sidewall 40 to move outward from the storage unit 24 is easily achieved. Moreover, as indicated by the virtual lines in FIG. 5, the movable sidewall 40 can be easily returned to the original state illustrated in FIG. 2 (the state where the movable sidewall 40 engages with the sidewall body portion 38) after the movable sidewall 40 moves outward from the storage unit 24.

The movable sidewall 40 is movable toward the front of the vehicle. This configuration prevents the movable sidewall 40 from interfering with occupants when the movable sidewall 40 moves outward from the storage unit 24. The movable sidewall 40 may also be movable toward the rear of the vehicle. Also in this case, the movable sidewall 40 does not interfere with the occupants when the movable sidewall 40 moves outward from the storage unit 24.

The switch panel 28 is disposed on a side of the storage space 25 adjacent to the rear of the vehicle. The movable sidewall 40 is disposed on a side of the storage space 25 adjacent to the front of the vehicle and is movable toward the front of the vehicle. With this configuration, in the case where the occupant operates the switch 29 disposed in the switch panel 28 or puts the hand (or arm) on the switch panel 28, and then the hand of an occupant comes into contact with the object 20 stored in the storage unit 24 and pushes the object 20 forward, the movable sidewall 40 pushed by the object 20 moves forward. Thus, the storage unit 24 disposed adjacent to the switch panel 28 or the object 20 is prevented from being damaged.

The storage unit 24 is provided for the vehicle door. This configuration prevents the storage unit 24 provided for the vehicle door from being damaged.

In the above-described embodiment, the sidewall member 32 is composed of a soft resin material and elastically deforms to enable the movable sidewall 40 to incline. However, the present invention is not limited to this. The sidewall member 32 may be composed of a hard material and may include a hinge portion at a middle part in the vertical direction to allow the movable sidewall 40 constituting an upper part above the hinge portion to incline outward (for example, forward) from the storage unit 24. In this case, the hinge portion may be formed of a thin portion or may be formed of a support hole portion and a shaft portion rotatably supported by the support hole portion. The movable sidewall 40 that can incline due to the hinge portion may be urged to be upright by a spring member (for example, a torsion spring) and may incline against the elastic force of the spring member when a force larger than or equal to a predetermined level acts on the movable sidewall 40 outward from the storage unit 24.

The movable sidewall 40 may be movable toward the vehicle cabin. The movement of the movable sidewall 40 is not limited to inclination. The movable sidewall 40 may be movable horizontally outward (for example, forward) from the storage unit 24.

The present invention is not limited in particular to the embodiment described above, and various modifications can be made thereto without departing from the scope of the present invention as set forth in the appended claims.

What is claimed is:

1. A storage structure for a vehicle interior, provided for an interior of a vehicle to store an object to be stored, said storage structure including a hollowed storage unit with an opening in a top of the storage unit, comprising:
    a storage sidewall section partially surrounding a storage space for the object, said storage sidewall section comprising a sidewall body portion and a sidewall member, the sidewall member being a member which is separate and removable from the sidewall body portion;
    a first engaging hook disposed on the sidewall member and protruding toward the sidewall body portion; and
    an engaging recess provided for the sidewall body portion at a part facing the sidewall member and with which the first engaging hook engages;
    wherein:
    the sidewall body portion is formed of a first plastic material;
    the sidewall member is formed from a flexibly resilient material which is softer than the first plastic material; and
    the sidewall member is configured in a manner that the first engaging hook is urged against the engaging recess when a load is applied on the sidewall member from an outside to an inside of the storage unit.

2. The storage structure for the vehicle interior according to claim 1, wherein the sidewall member includes a wall plate portion constituting a part of an outer surface of the storage sidewall section, protruding walls protruding from both sides of the wall plate portion in a width direction of the wall plate portion toward the storage space, and the first engaging hook protruding outward from a protruding end of one of the protruding walls.

3. The storage structure for the vehicle interior according to claim 2, wherein the sidewall member includes reinforcing portions each connecting an inner surface of the wall plate portion with an inner surface of the corresponding protruding wall.

4. The storage structure for the vehicle interior according to claim 1, wherein a bottom of the storage unit and a lower part of the sidewall member partially overlap with each other in a vertical direction.

5. The storage structure for the vehicle interior according to claim 1, wherein:
    a bottom of the storage unit includes a stepped wall portion forming a difference in level;
    the sidewall member includes a connecting protrusion connecting with the bottom of the storage unit; and the stepped wall portion includes a connecting hole with which the connecting protrusion engages.

6. The storage structure for the vehicle interior according to claim 1, wherein:
    the sidewall member includes a connecting protrusion engaging with a bottom of the storage unit;
    the bottom of the storage unit includes a connecting hole with which the connecting protrusion engages; and the connecting protrusion protrudes below the bottom of the storage unit through the connecting hole.

7. The storage structure for the vehicle interior according to claim 1, wherein:
   a bottom of the storage unit includes a first bottom portion formed of a member separate from the sidewall member and a second bottom portion constituting a lower part of the sidewall member; and
   the second bottom portion is provided with a reinforcing wall.

8. The storage structure for the vehicle interior according to claim 1, wherein a dowel brought into contact with the sidewall body portion is disposed on a surface of the sidewall member facing the sidewall body portion.

9. The storage structure for the vehicle interior according to claim 1, wherein the sidewall member is composed of a soft resin material.

10. The storage structure for the vehicle interior according to claim 1, wherein the storage unit is provided for a vehicle door.

11. The storage structure for the vehicle interior according to claim 1, wherein the sidewall member has at least one protrusion formed at a lower end thereof, and wherein the storage structure further comprises a holder member which cooperates with the sidewall member and the sidewall storage section to define the storage space, the holder member having at least one connecting hole formed therein to receive the at least one protrusion of the sidewall member.

12. The storage structure for the vehicle interior according to claim 1, wherein:
   the engaging recess of the sidewall body portion is a first recess, the sidewall member has a second engaging hook formed thereon on a side opposite the first engaging hook, and
   the holder member comprises a floor portion, for supporting the object to be stored in the storage area, and a sidewall portion having a second recess formed therein, the second hook being engageable with the second recess.

13. The storage structure for the vehicle interior according to claim 1, wherein the sidewall body portion defines part of an inner door panel, and wherein the sidewall member is configured to flexibly bend, when a load is applied thereto from inside of the storage space, in a manner such that the hook becomes temporarily disengaged from the recess.

14. A storage structure for a vehicle interior, provided for an interior of a vehicle to store an object to be stored, said storage structure defining a hollowed storage unit with an opening in a top portion thereof and comprising:
   a sidewall body portion which is part of a vehicle door panel, the sidewall body portion having a first engaging recess formed therein, the sidewall body portion having at least one protrusion at a lower end thereof,
   a sidewall member which is separate from the sidewall body portion, the sidewall member having a first engaging hook disposed on a first side edge thereof and removably engaged in the first recess of the sidewall body portion; and
   a holder member which cooperates with the sidewall member and the sidewall storage section to define the storage space, the holder member having at least one connecting hole formed therein to receive the at least one protrusion of the sidewall member;
   wherein:
   the sidewall body portion is formed of a first plastic material;
   the sidewall body portion is formed from a flexibly resilient material which is softer than the first plastic material; and
   the sidewall member is configured in a manner that the engaging hooks are urged against the engaging recess when a load is applied on the sidewall member from an outside to an inside of the storage unit.

15. The storage structure for the vehicle interior according to claim 14, wherein the sidewall member includes a wall plate portion having protruding walls protruding from both sides thereof in a width direction of the wall plate portion toward the storage space, and wherein the first and second engaging hooks protrude outwardly from protruding ends of the protruding walls, respectively.

16. The storage structure for the vehicle interior according to claim 15, wherein the sidewall member includes reinforcing portions, each connecting an inner surface of the wall plate portion with an inner surface of the corresponding protruding wall.

17. The storage structure for the vehicle interior according to claim 14, wherein a bottom of the holder member and a lower part of the sidewall member partially overlap with each other in a vertical direction.

18. The storage structure for the vehicle interior according to claim 14, wherein:
   the holder member includes a stepped wall portion forming a difference in level, the at least one connecting hole being formed in the stepped wall portion.

* * * * *